US012319544B2

(12) United States Patent
Wahrburg et al.

(10) Patent No.: US 12,319,544 B2
(45) Date of Patent: Jun. 3, 2025

(54) METHOD FOR OPERATING A CRANE

(71) Applicant: ABB Schweiz AG, Baden (CH)

(72) Inventors: Arne Wahrburg, Weiterstadt (DE); Janne Jurvanen, Espoo (FI); Matias Niemela, Helsinki (FI); Mikael Harry Holmberg, Porvoo (FI)

(73) Assignee: ABB Schweiz AG, Baden (CH)

( * ) Notice: Subject to any disclaimer, the term of this patent is extended or adjusted under 35 U.S.C. 154(b) by 225 days.

(21) Appl. No.: 17/954,493

(22) Filed: Sep. 28, 2022

(65) Prior Publication Data

US 2023/0100950 A1 Mar. 30, 2023

(30) Foreign Application Priority Data

Sep. 30, 2021 (EP) .................................... 21200089

(51) Int. Cl.
*B66C 13/06* (2006.01)
*B66C 13/46* (2006.01)

(52) U.S. Cl.
CPC ............ *B66C 13/063* (2013.01); *B66C 13/46* (2013.01)

(58) Field of Classification Search
CPC ........ B66C 13/063; B66C 13/46; B66C 13/48
See application file for complete search history.

(56) References Cited

U.S. PATENT DOCUMENTS 5,792,483 A * 8/1998 Siegrist ............... B29C 45/5008 425/162
9,785,139 B2 * 10/2017 Oda ....................... G05B 19/19
2014/0300308 A1 * 10/2014 Ikeda ...................... H02P 21/18 318/561
2023/0100950 A1 * 3/2023 Wahrburg .............. B66C 13/46 701/50

FOREIGN PATENT DOCUMENTS

GB 2280045 A 1/1995
JP 2010-30728 A 2/2010

OTHER PUBLICATIONS

Garrido et al., "Anti-Swinging Input Shaping Control of an Automatic Construction Crane," *IEEE Transactions on Automation Science and Engineering*, 5(3): 549-557 (Jul. 2008).
Ramli et al., "Control strategies for crane systems: A comprehensive review," *Mechanical Systems and Signal Processing* (*MSSP*), 95, 23 pp. (Mar. 24, 2017).

(Continued)

*Primary Examiner* — Frederick M Brushaber
(74) *Attorney, Agent, or Firm* — Leydig, Voit & Mayer, Ltd.

(57) ABSTRACT

A computer-implemented method for operating a crane includes generating speed data for a drive unit of the crane such that oscillations of the crane are suppressed; providing a compatibility model configured to describe a relation between input speed reference data of a drive unit of a crane and output position reference data of the drive unit of the crane; determining position reference data of the drive unit of the crane by inputting the speed reference data into the compatibility model; and providing the position reference data of the drive unit of the crane to a control of the drive unit of the crane and controlling the drive unit of the crane according to the position reference data.

11 Claims, 2 Drawing Sheets

(56) References Cited

OTHER PUBLICATIONS

Sorensen et al., "A controller enabling precise positioning and sway reduction in bridge and gantry cranes," *Control Engineering Practice*, 15(7): 825-837 (Apr. 19, 2007).

European Patent Office, Extended European Search Report in European Patent Application No. 21200089.7, 8 pp. (Mar. 23, 2022).

* cited by examiner

METHOD FOR OPERATING A CRANE

CROSS-REFERENCE TO RELATED APPLICATIONS

This patent application claims priority to European Patent Application No. 21200089.7, filed on Sep. 30, 2021, which is incorporated herein in its entirety by reference.

FIELD OF THE DISCLOSURE

The present disclosure relates to a computer-implemented method for operating a crane, to a device for operating a crane, to a system and to a computer program product configured to carry out the steps of such a method.

BACKGROUND OF THE INVENTION

Cranes are widely used for moving goods in warehouses, plants or ports. Cranes are well known in the state of the art. Cranes are operated manually and automatically. The goods moved with a crane act like a load and may oscillate. This may be a challenge by moving goods.

It has now become apparent that there is a further need to provide a possibility for operating a crane.

BRIEF SUMMARY OF THE INVENTION

In view of the above, the present disclosure describes a method for operating a crane, in particular it is an object of the present invention to provide an improved method for operating a crane.

In one aspect of the present disclosure, a computer-implemented method for operating a crane is provided, comprising the steps of:

- generating speed reference data for a drive unit of the crane such that oscillations of the crane are suppressed;
- providing a compatibility model configured to describe a relation between input speed reference data of a drive unit of a crane and output position reference data of the drive unit of the crane;
- determining position reference data of the drive unit of the crane by inputting the speed reference data into the compatibility model; and
- providing the position reference data of the drive unit of the crane to a control of the drive unit of the crane and controlling the drive unit of the crane according to the position data.

The method thereby may advantageously provide a position control mode and an anti-sway control mode for the drive unit, wherein the position control mode and anti-sway control mode are compatible to each other. Optionally, determining position reference data of the drive unit of the crane may further comprise inputting the preliminary position data.

BRIEF DESCRIPTION OF THE SEVERAL VIEWS OF THE DRAWING(S)

In the following, the present disclosure is described exemplarily with reference to the enclosed figures.

DETAILED DESCRIPTION OF THE INVENTION

Figure 1:
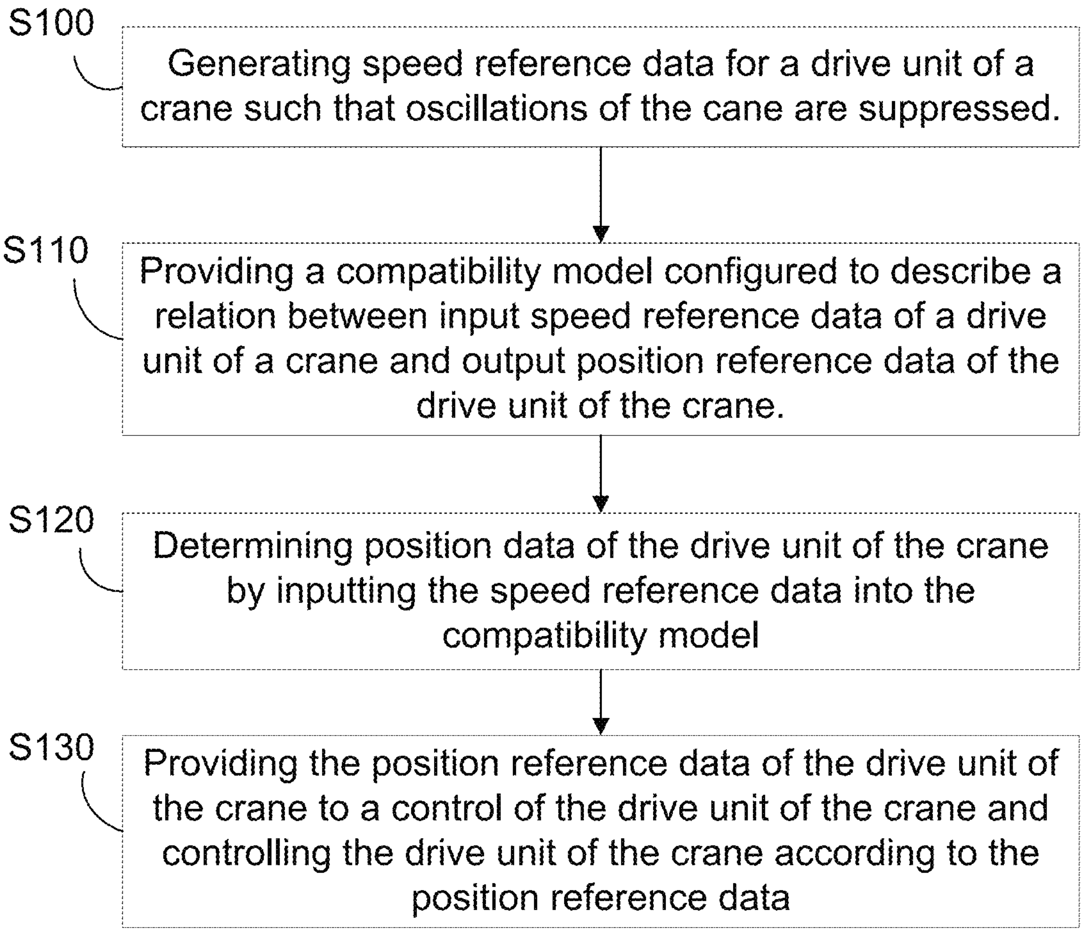
FIG. 1 is a flow diagram of an example method for operating a crane in accordance with the disclosure.

FIG. 1 shows a flow diagram of an example method for operating a crane.

Step S100 comprises generating speed reference data for a drive unit of the crane such that oscillations of the crane are suppressed (S100). The generating of the speed reference data may comprise a use of a trajectory generator for generating preliminary speed data and preliminary position data. The generating of the speed reference data may comprise a use of a speed data input shaper configured to modify preliminary speed data such that load oscillations are suppressed. The crane may be an overhead crane or a stacker crane or a tower crane. The drive unit may comprise one or more drive axles.

Step S110 comprises providing a compatibility model configured to describe a relation between input speed reference data of a drive unit of a crane and output position reference data of the drive unit of the crane (S110).

Step S120 comprises determining position data of the drive unit of the crane by inputting the speed reference data into the compatibility model (S120).

Step S130 comprises providing the position reference data of the drive unit of the crane to a control of the drive unit of the crane and controlling the drive unit of the crane according to the position reference data (S130). The control of the drive unit of the crane may comprise a proportional controller in a position loop. The control of the drive unit of the crane may comprise a proportional-integral controller in a speed loop.

The method may be executed in the control of the drive unit respectively in the control of the drive axle. Optionally the method may further comprise the step of providing the speed reference data to the control of the drive unit of the crane. Optionally the method may further comprise the step of providing the preliminary speed data to the control of the drive unit of the crane. Optionally the method may further comprise the step of selecting one or more of the following position control mode, speed control mode and anti-sway control mode.

Figure 2:
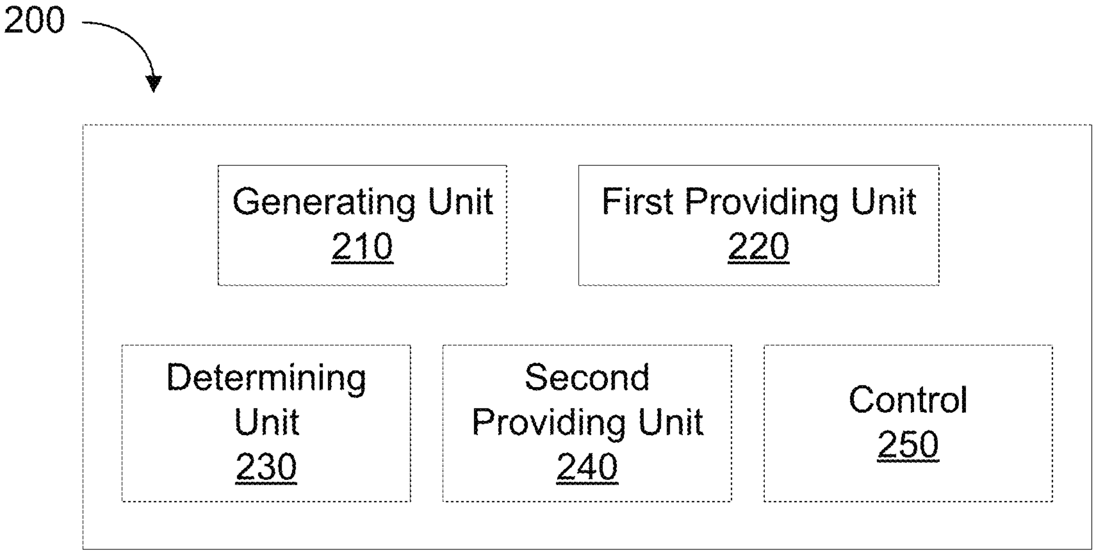
FIG. 2 is a schematic illustration of an example device for operating a crane in accordance with the disclosure.

FIG. 2 shows a schematic illustration of an example device 200 for operating a crane.

The device 200 comprises a generating unit (210) configured to generate speed reference data for a drive unit of the crane such that oscillations of the crane are suppressed; a first providing unit (220) configured to provide a compatibility model configured to describe a relation between input speed reference data of a drive unit of a crane and output position reference data of the drive unit of the crane; a determining unit (230) configured to determine position reference data of the drive unit of the crane by inputting the speed reference data into the compatibility model; a second providing unit (240) configured to provide the position reference data of the drive unit of the crane to a control of the drive unit of the crane; a control (250) configured to control the drive unit of the crane according to the position reference data.

Figure 3:
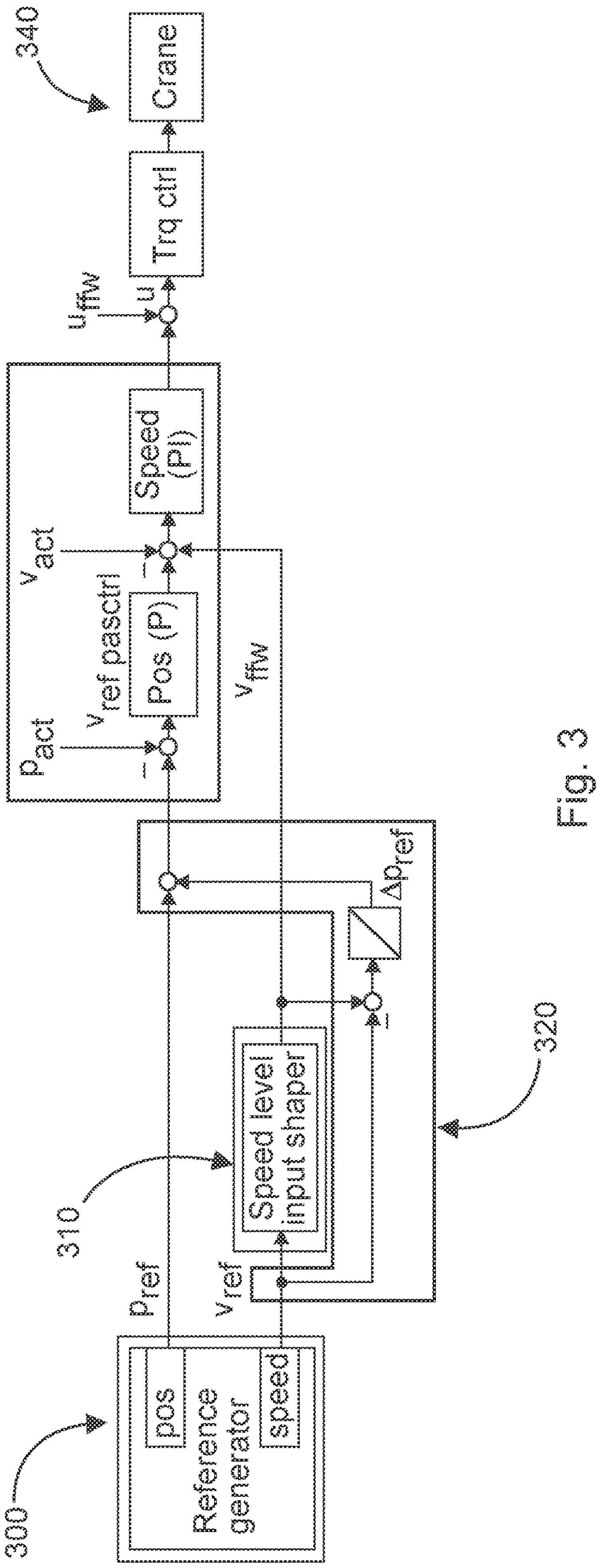
FIG. 3 is a block diagram of a concept scheme of an exemplary device for operating a crane in accordance with the disclosure.

FIG. 3 shows a concept scheme of the example device for operating a crane. A reference generator 300 may generate preliminary position data and preliminary speed data. A speed level input shaper 310 may generate speed reference data by processing the preliminary speed data such that oscillations are suppressed. The compatibility model 320 may determine position reference data by inputting the speed reference data into compatibility model 320 and optionally by inputting the preliminary position data. The controller 330 may control a drive unit of the crane 340 according to the position reference data and optionally according to the speed reference data.

In the following, a summary of the main effects and main advantages of the present disclosure is provided.

The proposed invention may comprise a drive-based solution for integrating a position control and an anti-sway functionality (i.e. anti-sway control mode) for cranes or any material handling application, especially if the load is acting as an oscillating mass. Optionally the invention may comprise also a PLC based solution.

Conventionally, anti-sway functionality is available in speed control mode, which is used e.g., for manual crane operation. Position control (which is needed for autonomous operation) is typically realized on external control system, e.g., PLCs. Such external position control can interfere with anti-sway.

The proposed solution may be computationally slim and may be fully integrated into the drive unit and may not require any additional sensing (pure software feature). The concept may be modular in the sense that the same control 250 can be used in anti-sway mode and speed control mode and position control mode.

Furthermore, the concept may be independent of the crane type and may apply to both overhead and stacker cranes as well as tower cranes.

One major challenge in controlling cranes may be load oscillations. Upon accelerating the bridge or trolley, the load (or the tip of a stacker crane, respectively) inevitably may start swinging.

Anti-sway (or anti-pendulum) control schemes aim at suppressing such oscillations. Commonly, input shapers may be employed which modify the original speed data such that load oscillations cancel out. Speed control may be sufficient for manual crane operation (i.e., an operator may provide the speed data using an input device such as buttons or a joystick). However, automatic crane operation may become more important e.g. in autonomous warehouses. Automatic operation may require cranes to be position controlled. The problem may that simply closing an outer position loop around a speed-controlled crane may result in the position controller competing with the speed control mode and anti-sway control mode. As a consequence, suppression of load oscillations cannot be achieved.

The proposed solution may address this problem, which may allow to fully integrate position control mode and anti-sway control mode in the drive unit. The concept may be modular (can be used both for position and speed control), may not require any sensing, and can be applied to both overhead and stacker cranes. It may have built in functionality inside to allow the user to switch between different modes, like only speed control mode or speed control+anti-sway control mode or speed anti-sway control mode & position control.

Higher application safety can be reached, when the application (load) is not swinging in an uncontrollable manner and causing damage on the crane components.

Higher material handling efficiency can be reached, when the application does not require waiting time at the target position for the load to stop swinging before performing the final positioning. Integrating the solution inside a drive may be a cost-effective solution, but also more robust.

The proposed solution may include four main modules:

a) A trajectory/profile generator for generating smooth preliminary position data and preliminary speed data that are compatible to each other (i.e., position data may be the integral of speed data). A common approach may be jerk-limited trajectory generation.

b) A standard cascade (e.g. proportional controller in the outer position loop, proportional-integral controller in the inner speed loop) with optional acceleration/torque feedforward for tracking the position reference data and speed reference data. The proportional position controller may fed by a difference between position reference data and actual position data, and may generate a component (i.e. output) of the speed reference data. The proportional-integral controller may be fed by the difference of the position controller output and an actual speed data. Furthermore, a speed feedforward signal may be added to the input of the speed controller to reduce a tracking error. Optionally, a torque feed-forward signal can be added to the speed controller output.

c) A speed-data input shaper (i.e. speed level input shaper) for modifying the preliminary speed data such that load oscillations are suppressed. Input shapers may convolve an input by a sequence of Dirac impulses. If an unshaped input excites oscillations in a system, the idea is to shape the input such that the system is excited multiple times but having the induced oscillations cancel out each other. Input shaper may be one of the following two-pulse ZV shapers ("zero vibration"), three-pulse ZVD shapers ("zero vibration and damping") and four-pulse ETM4 shapers ("equal shaping-time and magnitude"). This oscillation time may depend on the mechanical properties of the system at hand, and it may vary with rope length (overhead cranes) or hoist position (stacker cranes). However, with a relation between rope length/hoist position and oscillation time known or approximated, the input shaper can be adjusted during runtime.

d) A position reference modulator for ensuring position reference data and speed reference data remain compatible.

The position reference modulator (i.e. compatibility model) may inform the position controller about the modifications of the speed reference data. Thereby, the method may ensure that position reference data and speed reference data remain compatible and thus may ensure that position control and speed-data input shaping not compete or work against each other. The method may completely be integrated into the drive unit.

The position reference modulator may calculate the difference between the shaped speed reference data and original speed reference data (i.e. preliminary speed data). This difference may be fed to an integrator. The integrator output may be added to the original position reference (i.e. preliminary position data) before feeding it to the position controller. As a result, the position reference data and speed reference data that are ultimately sent to the P-PI servo cascade for tracking may be compatible. Thereby, the outer loop position controller and the anti-sway component in the speed controller may not compete against in each other.

In an embodiment of the method, the control of the drive unit of the crane may comprise a controller, e.g. proportional controller, in a position loop.

In an embodiment of the method, the control of the drive unit of the crane may comprise a controller, e.g. a proportional-integral controller, in a speed loop.

In an embodiment of the method, generating the speed data may comprise a use of a trajectory generator for generating preliminary speed data and preliminary position data.

In an embodiment of the method, the method may further comprise the step of providing the speed data to the control of the drive unit of the crane. The method thereby may advantageously provide a speed control mode for the drive unit.

In an embodiment of the method, the method may further comprise the step of providing the preliminary speed data to the control of the drive unit of the crane.

In an embodiment of the method, the crane may be a stacker crane.

In an embodiment of the method, the crane may be an overhead crane.

In an embodiment of the method, the crane may be a tower crane or a gantry crane.

In an embodiment of the method, the drive unit may comprise at least one drive axle.

A further aspect of the present disclosure relates to a device for operating a crane, comprising:

a generating unit configured to generate speed data for a drive unit of the crane such that oscillations of the crane are suppressed;

a providing unit configured to provide a compatibility model configured to describe a relation between input speed data of a drive unit of a crane and output position data of the drive unit of the crane;

a determining unit configured to determine position data of the drive unit of the crane by inputting the speed data into the compatibility model;

a providing unit configured to provide the position data of the drive unit of the crane to a control of the drive unit of the crane;

a control configured to control the drive unit of the crane according to the provided position data.

A further aspect of the present disclosure relates to a system, comprising:

a device for operating a crane as described above;

a crane.

In an embodiment, the system may be provided, wherein the crane may be a stacker crane or an overhead crane.

A last aspect of the present disclosure relates to a computer program element, which when executed by a processor is configured to carry out the method as described above, and/or to control a device as described above, and/or to control a system as described above.

The term crane has to be understood broadly and relates to any material handling system with a hook and/or a crane rope. The crane may be an overhead crane, a mast/stacker crane, a trolley or the like. The crane may comprise at least one drive unit.

The term drive unit has to be understood broadly and relates in particular to a drive unit of crane configured to drive the crane from a spatial position to a further spatial position. The drive unit may comprise at least a control and at least one drive axle.

The term drive axle has to be understood broadly and relates in particular to an electro mechanical motor and a gear configured to generate mechanical movement of a part of the crane or of the entire crane. The drive axle may be a ball screw drive, a pinion rack drive, a winch motor, a belt drive or the like. The crane may have one or more drive axles.

The term speed reference data has to be understood broadly and relates in particular to any data configured to control a speed of a drive unit respectively a drive axle. More particular, the term speed reference data, as used herein, relates to speed reference data configured to suppress load oscillations of a crane. The speed reference data may be derived from a speed data (i.e. speed level) input shaper configured to modify preliminary speed data such that load oscillations are suppressed. The speed reference data serves as a reference variable for the speed control.

The term position reference data has to be understood broadly and relates in particular to any data configured to control a position of a drive unit respectively of a drive axle. More particular, the term position reference data, as used herein, relates to position reference data configured to be compatible to speed reference data when both used in respective feedback controls. The position reference data may be derived from a compatibility model as described below. The position reference data serves as a reference variable for a position control.

The terms preliminary position data and preliminary speed data as used herein have to be understood broadly and relate in particular to positions and speeds of a drive unit respectively a drive axle that are compatible to each other. The preliminary position data and the preliminary speed data may be generated with a trajectory/profile generator. The preliminary position data may be generated by integrating preliminary speed data.

The term compatibility model has to be understood broadly and relates in particular to a model configured to describe a relation between input speed reference data of a drive unit of a crane and output position reference data of the drive unit of the crane. The compatibility model may comprise one or more motion equations describing the motion of crane, wherein the crane may be described as multibody system (e.g. hook, rope, bridge, etc.). The compatibility model may comprise a function for calculating position reference data on the basis of input speed reference data, wherein the calculated position reference data are compatible to the input speed reference data. The calculation of the position reference data may further consider preliminary position data. The preliminary position data may be generated by integrating preliminary speed data. The preliminary position data may be adapted in order to be compatible with the preliminary speed data. The calculated or determined position reference data is compatible to the speed reference data. Both speed reference data and position reference data may be used for controlling the drive unit in respective feedback controls.

The term control has to be understood broadly and relates to any logic configured to execute a program respectively to carry out the steps of a method described above. The control may be part of the drive unit respectively of the drive axle.

The term controller has to be understood broadly and relates to any controller configured to control a position loop and/or a speed loop of a drive unit respectively a drive axle. The controller may comprise one or several terms of proportional, integral and derivative terms.

The term proportional controller relates to a feedback controller configured to control a position loop of a drive unit respectively of a drive axle. The proportional controller comprises a proportional term for controlling the position loop.

The term proportional-integral controller relates to a feedback controller configured to control a speed loop of a drive unit respectively of a drive axle. The proportional-integral controller comprises a proportional term and an integral term for controlling the speed loop.

The term position control mode has to be understood broadly and relates in particular to a control mode of the drive unit with a position as reference variable.

The term speed control mode has to be understood broadly and relates in particular to control mode of the drive unit with a speed as reference variable.

The term anti-sway mode has to be understood broadly and relates in particular to a control mode of the drive unit configured to suppress oscillations of the load.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Units or devices may include one or more interface circuits. In some examples, the interface circuits may include wired or wireless interfaces that are connected to a local area network (LAN), the Internet, a wide area network (WAN), or combinations thereof. The functionality of any given device or unit of the present disclosure may be distributed among multiple units or devices that are connected via interface circuits.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store;

computer programs, program code, instructions, or some combination thereof.

Any disclosure and embodiments described herein relate to the methods, the systems, the devices, the computer program element lined out above and vice versa. Advantageously, the benefits provided by any of the embodiments and examples equally apply to all other embodiments and examples and vice versa.

As used herein "determining" also includes "initiating or causing to determine", "generating" also includes "initiating or causing to generate" and "providing" also includes "initiating or causing to determine, generate, select, send or receive". "Initiating or causing to perform an action" includes any processing signal that triggers a computing device to perform the respective action.

REFERENCE SIGNS

S100 generating speed data for a drive unit of the crane
S110 providing a compatibility model
S120 determining position data
S130 providing the position data and controlling the drive unit of the crane according to the position data
200 device
210 generating unit
220 first providing unit
230 determining unit
240 second providing unit
250 control
300 reference generator
310 speed level input shaper
320 compatibility model
330 controller
340 crane All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A computer-implemented method for operating a crane, comprising:

generating speed reference data for a drive unit of the crane such that oscillations of the crane are suppressed, wherein generating the speed reference data comprises a use of trajectory generator for generating preliminary speed data and preliminary position data;

providing a compatibility model configured to describe a relation between input speed reference data of a drive unit of a crane and output position reference data of the drive unit of the crane;

determining position reference data of the drive unit of the crane by inputting the speed reference data into the compatibility model; and providing the position reference data of the drive unit of the crane to a control of the drive unit of the crane and controlling the drive unit of the crane according to the position reference data.

2. The method according to claim 1, wherein the control of the drive unit of the crane comprises a proportional controller in a position loop.

3. The method according to claim 1, wherein the control of the drive unit of the crane comprises a proportional-integral controller in a speed loop.

4. The method according to claim 1, further comprising the step of providing the speed reference data to the control of the drive unit of the crane.

5. The method according to claim 4, further comprising providing the preliminary speed data to the control of the drive unit of the crane.

6. The method according to claim 1, wherein the crane is a stacker crane.

7. The method according to claim 1, wherein the crane is an overhead crane.

8. The method according to claim 1, wherein the crane is a tower crane or a gantry crane.

9. The method according to claim 1, wherein the drive unit comprises at least one drive axle.

10. A device for operating a crane, comprising:

a controller, wherein the controller is configured to:

generate speed reference data for a drive unit of the crane such that oscillations of the crane are suppressed, wherein generating the speed reference data comprises a use of trajectory generator for generating preliminary speed data and preliminary position data;

provide a compatibility model configured to describe a relation between input speed reference data of a drive unit of a crane and output position reference data of the drive unit of the crane;

determine position reference data of the drive unit of the crane by inputting the speed reference data into the compatibility model;

provide the position reference data of the drive unit of the crane to a control of the drive unit of the crane; and control the drive unit of the crane according to the position reference data.

11. A system, comprising:

a crane; and a controller, wherein the controller is configured to:

generate speed reference data for a drive unit of the crane such that oscillations of the crane are suppressed, wherein generating the speed reference data comprises a use of trajectory generator for generating preliminary speed data and preliminary position data;

provide a compatibility model configured to describe a relation between input speed reference data of a drive unit of a crane and output position reference data of the drive unit of the crane;

determine position reference data of the drive unit of the crane by inputting the speed reference data into the compatibility model;

provide the position reference data of the drive unit of the crane to a control of the drive unit of the crane; and control the drive unit of the crane according to the position reference data.

* * * * *